US010053560B2

United States Patent
Zartman et al.

(10) Patent No.: US 10,053,560 B2
(45) Date of Patent: Aug. 21, 2018

(54) RUBBER COMPOSITION FOR PROMOTING ELECTRICAL CONDUCTIVITY, AND TIRE WITH COMPONENT

(71) Applicant: The Goodyear Tire & Rubber Company, Akron, OH (US)

(72) Inventors: Gregory Daniel Zartman, Akron, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 144 days.

(21) Appl. No.: 15/257,118

(22) Filed: Sep. 6, 2016

(65) Prior Publication Data

US 2018/0066128 A1    Mar. 8, 2018

(51) Int. Cl.
*H01B 1/24* (2006.01)
*C08L 9/00* (2006.01)
*C08J 3/00* (2006.01)
*C08L 7/00* (2006.01)

(52) U.S. Cl.
CPC .................. *C08L 9/00* (2013.01); *C08J 3/005* (2013.01); *C08L 7/00* (2013.01); *H01B 1/24* (2013.01)

(58) Field of Classification Search
CPC ................ C08L 7/00; C08L 9/00; H01B 1/24
See application file for complete search history.

(56) References Cited

U.S. PATENT DOCUMENTS

| 5,696,197 A * | 12/1997 | Smith ..................... C08J 3/226 152/905 |
| 5,773,504 A | 6/1998 | Smith et al. .................. 524/492 |
| 9,260,594 B2 | 2/2016 | Fuchs et al. .................. 524/492 |
| 2004/0116574 A1* | 6/2004 | Sandstrom ............... C08L 9/00 524/424 |
| 2007/0144644 A1* | 6/2007 | Zanzig ..................... B60C 1/00 152/209.5 |
| 2014/0196822 A1 | 7/2014 | Hirayama |

FOREIGN PATENT DOCUMENTS

| EP | 0814113 A2 | 12/1997 |
| EP | 3153330 A1 | 4/2017 |
| JP | 2016094561 A * | 5/2016 |

OTHER PUBLICATIONS

EPO search report received by Applicant dated Jan. 31, 2018.

* cited by examiner

*Primary Examiner* — Mark Kopec
*Assistant Examiner* — Jaison P Thomas
(74) *Attorney, Agent, or Firm* — Henry C. Young, Jr.

(57) ABSTRACT

The invention relates to a rubber composition and its preparation for providing a path of least electrical resistivity through an electrically resistive rubber composition for a tire with a component of such rubber composition, particularly a tire tread.

18 Claims, 3 Drawing Sheets

Phased Rubber Composite

Electrically Conductive Phase

Electrically Resistive Phase

Prior Methodology

Balanced Batch Mixing

RUBBER COMPOSITION FOR PROMOTING ELECTRICAL CONDUCTIVITY, AND TIRE WITH COMPONENT

FIELD OF THE INVENTION

The invention relates to a rubber composition and its preparation for providing a path of least electrical resistivity through an electrically resistive rubber composition for a tire with a component of such rubber composition, particularly a tire tread.

BACKGROUND OF THE INVENTION

Tires may be prepared with treads composed of diene-based rubber compositions which contain reinforcing filler comprised of a combination of rubber reinforcing carbon black and precipitated silica. The precipitated silica may be used together with a silica coupling agent to couple the precipitated silica to diene-based elastomers contained in the rubber composition.

Here it is desired to provide a rubber composition for a vehicular tire tread having a relatively low hysteresis to thereby promote relatively low internal heat generation during tire service with an accompanying low internal temperature rise and beneficially low rolling resistance for a tire with tread of such rubber composition.

To promote such property for such rubber composition for a tire tread, it is desired for its reinforcing filler to contain a relatively low level (low content) of rubber reinforcing carbon black.

However, providing a significantly low level of rubber reinforcing carbon black in the rubber composition also promotes a significantly high electrical resistivity (low electrical conductivity) for the rubber composition to thereby resist transmission of electrical energy through the rubber composition for dissemination of the electrical energy from the tread to the ground.

Therefore, a challenge is presented for providing a tire tread of a rubber composition containing reinforcing filler comprised of a relatively low level of rubber reinforcing carbon black yet which also promotes significant electrical conductivity.

For such challenge, it is proposed to evaluate providing relatively incompatible dual rubber phases, such as a synthetic cis 1,4-polybutadiene rubber based rubber phase and a natural cis 1,4-polisoprene rubber based rubber phase. They are considered to be relatively incompatible with each other in the sense of having solubility parameters which are significantly different from each other.

It is proposed for the natural rubber based rubber composition to be a continuous rubber phase containing a dispersed cis 1,4-polybutadiene based rubber phase. The natural rubber phase is contemplated as being the continuous rubber phase in a sense of forming a network within the dual phase system which has a continuous path for conduction of an electrical charge.

It is proposed for the filler reinforcement of the natural rubber based continuous phase to be primarily rubber reinforcing carbon black and therefore exist as a relatively electrically conductive rubber phase. It is proposed for the filler reinforcement for the cis 1,4-polybutadiene based rubber phase to be primarily precipitated silica with little or no rubber reinforcing carbon black and therefore exist as a relatively electrically resistive rubber phase.

It is also proposed to resist the migration of the aforesaid carbon black and precipitated silica rubber reinforcing fillers between the aforesaid rubber phases to thereby promote maintenance of their respective electrical conductivity and electrical resistivity properties.

In particular, it is proposed to promote resistance of significant migration of the rubber reinforcing carbon black from the dispersed natural rubber based rubber phase into the cis 1,4-polybutadiene based rubber phase by relying on inherent affinity of the rubber reinforcing carbon black for the natural rubber based rubber phase in a sense of the ability of natural rubber or cis 1,4-polyisoprene to produce bound rubber with carbon black as a result of its ability to create high shear mixing and produce a polymer break down structure that binds it to carbon black surface. This binding with carbon black will help resist the migration of the carbon black to the cis 1,4-polybutadiene phase.

In particular, it is proposed to promote resistance to significant migration of the precipitated silica from the dispersed cis 1,4-polybutadiene based rubber based rubber phase into the continuous natural rubber based rubber phase by providing a silica coupler to couple the precipitated silica to the cis 1,4-polybutadiene rubber. A coupling of the precipitated silica is promoted by a combination of reaction of coupler with hydroxyl groups (e.g. silanol groups) of the precipitated silica and interaction with the carbon-to-carbon bonds of the diene-based elastomer(s) of the cis 1,4-polybutadiene based rubber phase.

The term "phr" where used herein, and according to conventional practice, refers to "parts of a respective material per 100 parts by weight of rubber, or elastomer".

The terms "rubber" and "elastomer" where used herein, are to be used interchangeably, unless otherwise indicated. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "vulcanize" and "cure" where used herein are used interchangeably unless otherwise indicated.

SUMMARY AND PRACTICE OF THE INVENTION

In accordance with this invention, a method of providing a rubber composition, wherein said method comprises:

(A) providing a first electrically conductive rubber composition comprised of at least about 50, alternately from about 50 to about 80, parts by weight of rubber reinforcing carbon black per 100 parts by weight rubber in said first rubber composition, wherein the elastomer(s) thereof is comprised of at least 50, alternately at least about 80 and alternately about 100 weight percent cis 1,4-polyisoprene rubber, desirably natural cis 1,4-polyisoprene rubber, with the remainder (if any) comprised of cis 1,4-polybutadiene rubber, (B) providing a second electrically resistive rubber composition in said first electrically conductive rubber phase comprised of diene-based elastomer(s) and of from about 40 to about 80 parts by weight precipitated silica per 100 parts by weight of rubber of said second electrically resistive rubber phase together with silica coupler for said precipitated silica having a moiety reactive with hydroxyl groups of said precipitated silica and another different moiety interactive with said diene-based elastomer(s), wherein the elastomer(s) thereof are comprised of at least 50, alternately at least about 80 and alternately about 100 weight percent cis 1,4-polybutadiene rubber with the remainder (if any) comprised of cis 1,4-polyisoprene rubber, (C) blending the first and second rubber compositions together to form a phased rubber composition comprised of a continuous electrically conductive first rubber phase comprised of said first rubber composition and a second rubber phase as dispersed rubber domains in said first rubber phase where said dispersed rubber domains are comprised of said second electrically resistive rubber composition wherein said phased rubber composition blend contains a maximum of 35, alternately a maximum of 30, parts by weight rubber reinforcing carbon black and about 20 to about 50 parts by weight of precipitated silica per 100 parts by weight of elastomers contained in said phased rubber composition blend.

In one embodiment, said method further comprises blending sulfur and at least one sulfur cure accelerator with said phased rubber composition followed by sulfur curing the phased rubber composition.

In further accordance with this invention, a phased rubber composition is provided by such method where the rubber composition is comprised of said continuous electrically conductive phase containing the dispersed electrical resistive phase.

In additional accordance with this invention, a phased rubber composition is provided which is comprised of:

(A) a continuous electrically conductive cis 1,4-polyisoprene based rubber phase containing at least 50, alternately from about 50 to about 80, phr of rubber reinforcing carbon black in said first rubber composition, wherein the elastomer(s) thereof is comprised of at least 50, alternately at least about 80 and alternately about 100 weight percent cis 1,4-polyisoprene rubber, desirably natural cis 1,4-polyisoprene rubber, with the remainder (if any) comprised of cis 1,4-polybutadiene rubber, and (B) dispersed domains contained in said continuous rubber phase comprised of a cis 1,4-polybutadiene based rubber phase containing about 40 to about 80 phr of precipitated silica together with silica coupler for said precipitated silica having a moiety reactive with hydroxyl groups of said precipitated silica and another different moiety interactive with said diene-based elastomer(s), wherein the elastomer(s) thereof are comprised of at least 50, alternately at least 80 and alternately about 100, weight percent cis 1,4-polybutadiene rubber with the remainder (if any) comprised of cis 1,4-polyisoprene rubber, wherein the blend of phased rubber compositions contains a maximum of 35, alternately a maximum of about 30, phr of rubber reinforcing carbon black.

In practice the rubber composition is provided as a sulfur cured rubber composition.

In one embodiment, for said second dispersed rubber phase, said precipitated silica is provided as a composite comprised of a reaction product of precipitated silica and silica coupler reacted together in situ within the rubber composition.

In another embodiment, for said second dispersed rubber phase, said precipitated silica is provided as a composite of reaction product of precipitated and silica coupler pre-reacted together prior to introduction into the rubber composition.

It is considered that the blend of said first and second rubber phases contains a maximum of 35, alternately a maximum of 30, parts of the rubber reinforcing carbon black per 100 parts of elastomers contained in said phased rubber composition prepared without undue experimentation.

In one embodiment, the silica coupler is comprised of at least one of alkoxyorganomercaptosilane and bis(3-triethoxysilylpropyl) polysulfide containing an average of from 2 to about 4, alternately from about 2 to 2.6 or from 3.5 to 4, connecting sulfur atoms in its polysulfide bridge.

In one embodiment, each of said first and second rubber phases are individually mixed to a temperature in a range of from about 140° C. to about 170° C.

In one embodiment, said first and second phases are mixed together with sulfur and at least one sulfur vulcanization accelerator to a temperature in a range of from about 100° C. to about 130° C.

A significant aspect of this invention is providing a balanced blending of carbon black rich rubber phase with a precipitated silica containing rubber phase (together with silica coupler), to form incompatible rubber phases in which the carbon black rich phase is a dominate rubber phase to an extent of being a continuous rubber phase.

It is considered that the carbon black reinforcing filler remains preferentially and primarily associated with the cis 1,4-polyisoprene based elastomer rubber phase and the coupled precipitated silica remains preferentially primarily associated with the cis 1,4-polybutadiene rubber phase even after the two rubber phases are mixed together to thereby collectively provide individual reinforcements for the resultant rubber composition and the carbon black phase provides paths of electrical conductivity through the matrix.

In additional accordance with this invention, a tire is provided having at least one component comprised of such rubber composition.

In additional accordance with this invention, such tire component is a tire tread.

The rubber composition itself can be provided as being a sulfur cured composition through vulcanization of the uncured rubber composition as a tire component (e.g. tire tread) in a manner well known to those having skill in such art, usually by curing under conditions of elevated temperature and pressure in a suitable mold for a suitable period of time.

The curatives for sulfur curing the rubber composition are curatives conventionally used for sulfur curable elastomers which typically include an addition of free sulfur and one or more appropriate cure accelerators and sometimes also a cure retarder. Such curatives and use thereof for sulfur curable elastomer compositions are well known to those skilled in the art.

It is to be appreciated that the coupling agent, if in a liquid form, might be used in conjunction with a carbon black carrier, namely, pre-mixed with a carbon black, particularly a rubber reinforcing carbon black, prior to the addition to the rubber composition, and such rubber reinforcing carbon black can be included in the amount of rubber reinforcing carbon black accounted for in the rubber composition formulation.

It is therefore readily understood by those having skill in the art that the rubber composition would be compounded, as may be appropriate, by methods generally known in the rubber compounding art, such as mixing the various sulfur vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials. Depending on the intended use of the sulfur vulcanizable and sulfur vulcanized material (rubbers), the additives mentioned above are selected and commonly used in conventional amounts.

In the preparation of the rubber composition typical amounts of tackifier resins, if used, may comprise, for example, about 0.5 to about 10 phr, usually about 1 to about 5 phr. Typical amounts of processing aids may comprise, for example, about 1 to about 50 phr. Such processing aids can include, for example, aromatic, naphthenic, and/or paraffinic processing oils. Typical amounts of antioxidants may comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants, if used, may comprise, for example, about 1 to about 5 phr.

Typical amounts of fatty acids, where used, which can include stearic acid, palmitic acid, oleic acid or mixtures of one or more fatty acids, can comprise, for example from about 0.5 to about 5 phr.

Typical amounts of zinc oxide may comprise, for example, about 1 to about 5 phr. Typical amounts of waxes, usually microcrystalline waxes, if used, may comprise, for example, about 1 to about 5 phr. Typical amounts of peptizers, if used, may comprise, for example, from about 0.1 to about 1 phr. Typical peptizers may be comprised of, for example, pentachlorothiophenol and dibenzamidodiphenyl disulfide.

As indicated, the vulcanization is conducted in the presence of a sulfur vulcanizing agent. Examples of suitable sulfur vulcanizing agents include the elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used, for example, in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used, for example, in total amounts ranging from about 0.5 to about 4, preferably about 0.8 to about 2, phr. In another embodiment, combinations of a primary and a secondary accelerator might be used with the secondary accelerator being used in amounts of, for example, about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used, if desired and appropriate. Various accelerators that may be used are, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is generally a guanidine, dithiocarbamate or thiuram compound.

The presence and relative amounts of the above ingredients, other than aforesaid precipitated silicas and associated coupling agents are not considered to be a primary subject of this invention.

As hereinbefore discussed, the rubber composition prepared according to the method of this invention may be used, for example, as tire components such as tire treads. Such tires can be built, shaped, molded and cured by various methods which are known and will be readily apparent to those having skill in such art.

Drawings are provided to further illustrate the invention and its methodology which is not intended to unnecessarily limit the invention.

BRIEF DESCRIPTION OF DRAWINGS

Processes of preparing rubber compositions are illustrated by FIG. 1 (FIG. 1) and FIG. 2 (FIG. 2). A phased rubber product prepared by the process shown as FIG. 2 is illustrated by FIG. 3 (FIG. 3).

THE DRAWINGS

Figure 1:
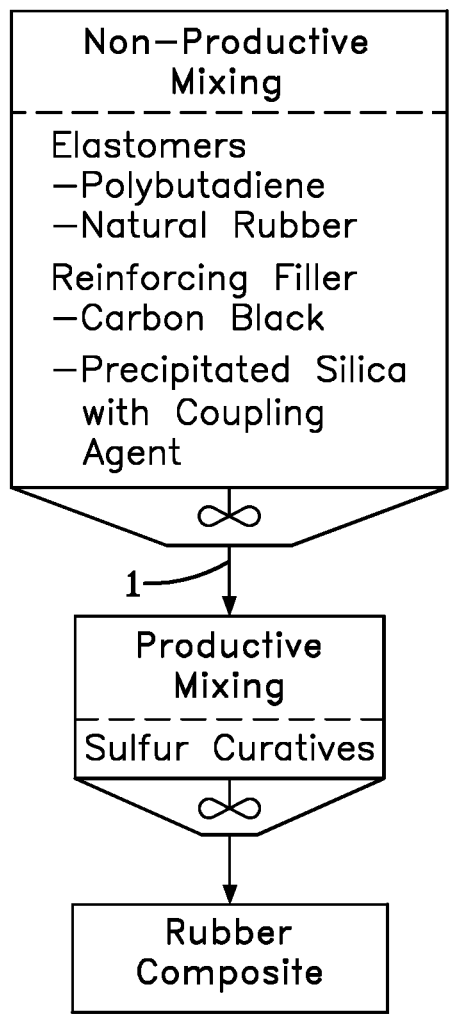
FIG. 1 illustrates a conventional step-wise method of preparation of a rubber composition.

In FIG. 1, a process of preparation of a rubber composition, is illustrated by conventional blending of natural rubber and cis 1,4-polybutadiene rubber with a combination of rubber reinforcing carbon black and precipitated silica to form a rubber composition comprised of a natural rubber based rubber phase and a cis 1,4-polybutadiene rubber based rubber phase which contain rubber reinforcing carbon black and precipitated silica dispersed equally in each of the rubber phases.

Figure 2:
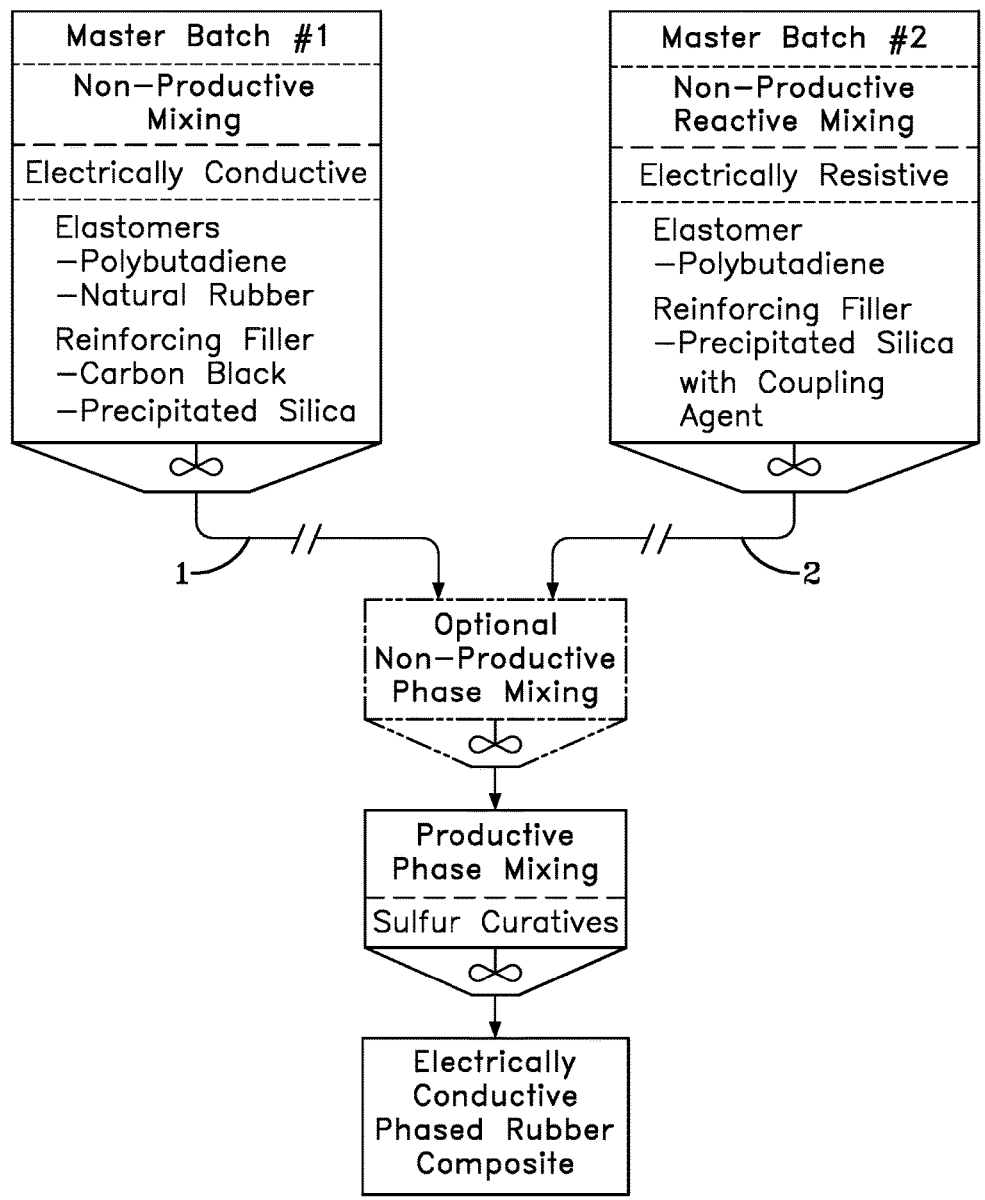
FIG. 2 illustrates a process of preparation of a phased rubber composition relating to the process of this invention.

In FIG. 2, an inventive process is illustrated of non-productive blending of masterbatch No 1 comprised of a non-productive mixed electrically conductive natural rubber based rubber phase containing filler reinforcement comprised of rubber reinforcing carbon black with masterbatch No. 2 comprised of a non-productive electrically resistive cis 1,4-polybutadiene based rubber phase containing filler reinforcement comprised of precipitated silica and coupling agent (silica coupler) for the precipitated silica. In FIG. 2, an optional further mixing of the already mixed non-productive mixed rubber blend is also shown. In FIG. 2, mixing of sulfur curatives with the rubber mixture in a productive rubber mixing step is also shown. In FIG. 2, a resultant rubber composition prepared by such mixing is shown.

Figure 3:
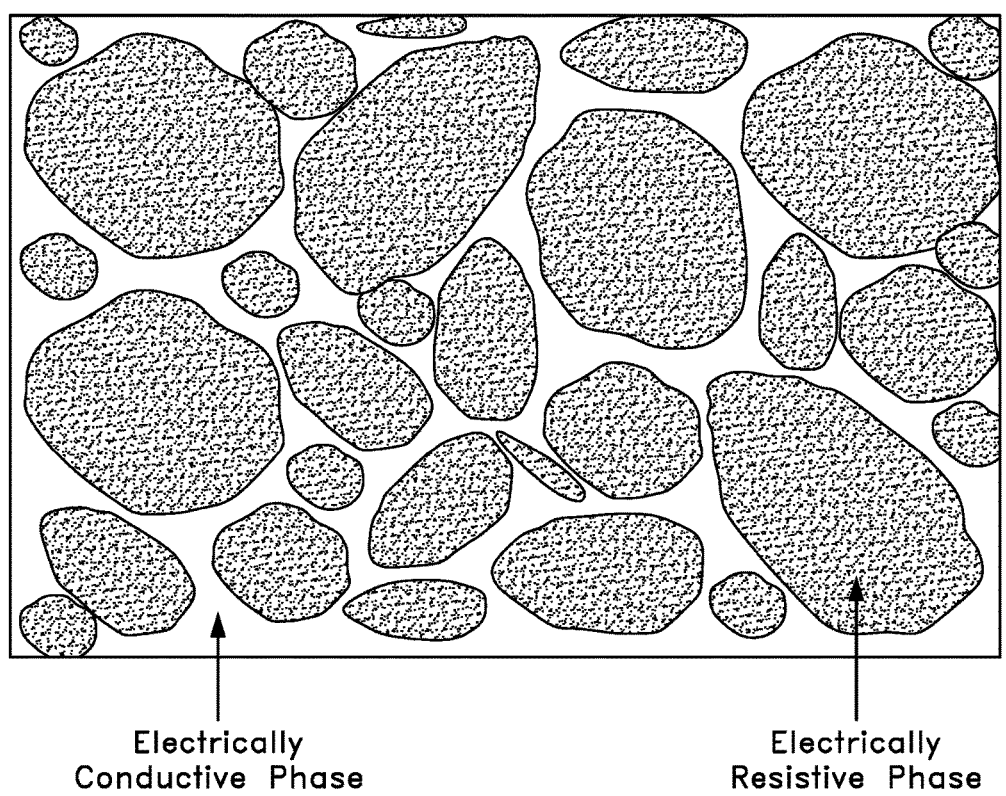
FIG. 3 illustrates a phased rubber product prepared by the process shown as FIG. 2 comprised of a continuous rubber phase containing a dispersed rubber phase.

In FIG. 3, the phased rubber composite is presented to illustrate the blend prepared by the process presented by FIG. 2, namely a blend of the aforesaid continuous electrically conductive phase, namely the electrically conductive rubber phase as masterbatch No. 1 of FIG. 2 comprised of the natural rubber based rubber phase containing the rubber reinforcing carbon black filler reinforcement, which contains domains dispersed therein of an electrically resistive phase, namely the electrically resistive rubber phase as masterbatch No. 2 of FIG. 2 comprised of the cis 1,4-polybutadiene based rubber phase containing the precipitated silica with silica coupler.

In this manner, for FIG. 3, a rubber composite, or composition, is illustrated with an electrically conductive path (path of least electrical resistance) provided through the rubber composite by the continuous electrically conductive phase, namely masterbatch No. 1.

The following examples are provided to further illustrate the invention. The parts and percentages are by weight unless otherwise indicated.

Example I

Rubber compositions are prepared containing rubber reinforcing carbon black.

Control rubber Sample A contains 34 parts by weight rubber reinforcing carbon black.

Experimental rubber Sample B comprised of a first electrically conductive rubber composition (referred to herein as masterbatch MB1) contains 68 parts by weight rubber reinforcing carbon black.

Experimental rubber Sample C comprised of a second electrically resistive rubber composition (referred to herein as masterbatch MB2) contains no (zero parts by weight) rubber reinforcing carbon black.

A blend is provided comprised of a blend of said first electrically conductive rubber composition (a continuous rubber phase) and said second electrically resistive rubber composition (a dispersed rubber phase within said continuous rubber phase).

The weight ratio of the MB1 and MB2 rubber compositions was 50/50 to yield a blend having the same rubber and reinforcing filler content as Control rubber Sample A.

The following Table 1 is a summary of materials for Control rubber Sample A, individual masterbatches MB1 and MB2 and a blend of masterbatches MB1 and MB2 (blend) where the parts are by weight (phr) unless otherwise indicated.

TABLE 1

| Materials | Control A | Exp. B MB1 | Exp. C MB2 | Blend MB1 + MB2 |
|---|---|---|---|---|
| Non-productive Mixing Step(s) | | | | |
| Cis 1,4-polybutadiene rubber1 | 75 | 50 | 100 | 75 |
| Natural Rubber2 | 25 | 50 | 0 | 25 |
| Precipitated silica3 | 32 | 0 | 65 | 32 |
| Silica coupling agent4 | 3.2 | 0 | 6.4 | 3.2 |
| Carbon black5 | 34 | 68 | 0 | 34 |
| Fatty acid6 | 2 | 2 | 2 | 2 |
| Zinc oxide | 3 | 3 | 3 | 3 |
| Productive Mixing Step - after mixing the Masterbatches | | | | |
| Sulfur | 1 | 1 | 1 | 1 |
| Sulfur cure accelerators(s)7 | 3 | 3 | 3 | 3 |

1Cis 1,4-polybutadiene rubber having a Tg (glass transition temperature) of about −104° C. as BUD1223 from The Goodyear Tire & Rubber Company
2Cis 1,4-polyisoprene rubber comprised of natural rubber
3Precipitated silica as Zeosil 1165 MP ™ from Solvay
4Silica coupling agent as Si266 ™ from Evonik
5Rubber reinforcing carbon black as N110, an ASTM designation
6Fatty acid comprised of stearic, palmitic and oleic acids
7Sulfur cure accelerators comprised of a combination of sulfenamide and diphenyl guanidine.

Various cured and uncured rubber properties of the rubber compositions are reported in the following Table 2.

TABLE 2

| Properties | Control A | Blend MB1 + MB2 |
|---|---|---|
| Tire Tread Predictive Handling Properties, Cured storage modulus (G')1 at 100° C., 11 Hertz (RPA)1 | | |
| 1 percent strain (KPa) | 2620 | 2650 |
| 10 percent strain (KPa) | 1310 | 1350 |
| Tire Tread Rolling Resistance Predictive Properties (higher values for rebound and lower values for tan delta are predictive of beneficial reduction in tire rolling resistance) | | |
| Rebound (100° C.) | 47 | 46 |
| Tan delta, (100° C., 10% strain, 11 Hertz) | 0.259 | 0.254 |
| Tire Tread Predictive Wet Performance Properties | | |
| Rebound, 0° C. | 20.1 | 20.8 |
| Tire Treadwear Predictive Property, Abrasion Resistance (rate of abrasion, lower is better) | | |
| Grosch abrasion2, high, mg/km | 1034 | 1148 |
| Tear Strength3, (peal adhesion) N | | |
| At 95° C. for testing | 70 | 53 |
| Electrical Resistivity | | |
| (Mega ohm*cm) At 23° C. | 4500 | 0.19 |

From Table 2 it can be seen that the handling, rolling resistance, wet traction, abrasion and tear properties of the Sample A (Control) and Sample B (Blend 1) are not markedly different.

From Table 2 it can also be seen that the electrical resistivity of the Control rubber Sample A is more than 20,000 times more resistive than the blend of masterbatches.

Therefore, it is concluded that the aforementioned masterbatch processing of a compound can have a drastic positive influence on compound resistivity with little to no tradeoff in the other indicated rubber composition mechanical properties.

While certain representative embodiments and details have been shown for the purpose of illustrating the invention, it will be apparent to those skilled in this art that various changes and modifications may be made therein without departing from the spirit or scope of the invention.

What is claimed is:
1. A method of providing a rubber composition wherein said method comprises:
(A) providing a first electrically conductive rubber composition comprised of at least about 50 parts by weight of rubber reinforcing carbon black per 100 parts by weight rubber in said first rubber composition, wherein the elastomer(s) thereof is comprised of at least 50 weight percent cis 1,4-polyisoprene rubber with the remainder comprised of cis 1,4-polybutadiene rubber,
(B) providing a second electrically resistive rubber composition in said first electrically conductive rubber phase comprised of diene-based elastomer(s) and of from about 40 to about 80 parts by weight precipitated silica per 100 parts by weight of rubber of said second electrically resistive rubber phase together with silica coupler for said precipitated silica having a moiety reactive with hydroxyl groups of said precipitated silica and another different moiety interactive with said diene-based elastomer(s), wherein the elastomer(s)

thereof are comprised of at least 50 weight percent cis 1,4-polybutadiene rubber with the remainder comprised of cis 1,4-polyisoprene rubber, (C) blending the first and second rubber compositions together to form a phased rubber composition comprised of a continuous electrically conductive first rubber phase comprised of said first rubber composition and a second rubber phase as dispersed rubber domains in said first rubber phase where said dispersed rubber domains are comprised of said second electrically resistive rubber composition wherein said phased rubber composition blend contains a maximum of 35 parts by weight rubber reinforcing carbon black and about 20 to about 50 parts of precipitated silica per 100 parts by weight of elastomers contained in said phased rubber composition blend.

2. The method of claim 1 wherein said method further comprises blending sulfur and at least one sulfur cure accelerator with said phased rubber composition followed by sulfur curing said phased rubber composition.

3. A rubber composition prepared by the method of claim 2.

4. A tire having a composite comprised of the rubber composition of claim 3.

5. The tire of claim 4 where said composite is a tire tread.

6. The method of claim 2 wherein, for said second dispersed rubber phase, said precipitated silica and silica coupler are reacted together in situ within the rubber composition to form a composite thereof.

7. The method of claim 2 wherein, for said second dispersed rubber phase, said precipitated silica and silica coupler are pre-reacted together prior to introduction into the rubber composition to form a composite thereof.

8. The method of claim 2 comprised of:

(A) providing a first electrically conductive rubber composition comprised of at least 80 parts by weight of rubber reinforcing carbon black per 100 parts by weight rubber in said first rubber composition, wherein the elastomer(s) thereof is comprised of about 50 weight percent natural cis 1,4-polyisoprene rubber with the remainder comprised of cis 1,4-polybutadiene rubber, (B) providing a second electrically resistive rubber composition in said first electrically conductive rubber phase comprised of diene-based elastomer(s) and of from about 40 to about 80 parts by weight precipitated silica per 100 parts by weight of rubber of said second electrically resistive rubber phase together with silica coupler for said precipitated silica having a moiety reactive with hydroxyl groups of said precipitated silica and another different moiety interactive with said diene-based elastomer(s), wherein the elastomer(s) thereof are comprised of about 80 weight percent cis 1,4-polybutadiene rubber with the remainder comprised of cis 1,4-polyisoprene rubber.

9. A sulfur cured rubber composition prepared by the method of claim 8.

10. A tire having a composite comprised of the rubber composition of claim 9.

11. The tire of claim 10 where said composite is a tire tread.

12. The rubber composition of claim 8 wherein, for said second dispersed rubber phase, said precipitated silica and silica coupler are reacted together in situ within the rubber composition to form a composite thereof.

13. The rubber composition of claim 8 wherein, for said second dispersed rubber phase, said precipitated silica and silica coupler are pre-reacted together prior to introduction into the rubber composition to form a composite thereof.

14. A phased rubber composition comprised of:

(A) a continuous electrically conductive cis 1,4-polyisoprene based rubber phase containing at least 50 phr of rubber reinforcing carbon black in said first rubber composition, wherein the elastomer(s) thereof is comprised of at least 50 weight percent cis 1,4-polyisoprene rubber with the remainder comprised of cis 1,4-polybutadiene rubber, and (B) dispersed domains contained in said continuous rubber phase comprised of a cis 1,4-polybutadiene based rubber phase containing about 40 to about 80 phr of precipitated silica together with silica coupler for said precipitated silica having a moiety reactive with hydroxyl groups of said precipitated silica and another different moiety interactive with said diene-based elastomer(s), wherein the elastomer(s) thereof are comprised of at least 50 weight percent cis 1,4-polybutadiene rubber with the remainder comprised of cis 1,4-polyisoprene rubber, wherein the blend of phased rubber compositions contains a maximum of 35 phr of rubber reinforcing carbon black.

15. The rubber composition of claim 14 wherein, for said second dispersed rubber phase, said precipitated silica is provided as a reaction product of precipitated silica and silica coupler reacted together in situ within the rubber composition.

16. The rubber composition of claim 14 wherein, for said second dispersed rubber phase, said precipitated silica is provided as a reaction product of precipitated silica and silica coupler pre-reacted together prior to introduction into the rubber composition.

17. The rubber composition of claim 14 as a sulfur cured rubber composition.

18. A tire having a tread comprised of the rubber composition of claim 17.

* * * * *